United States Patent [19]

Ratzesberger

[11] Patent Number: 5,284,517
[45] Date of Patent: Feb. 8, 1994

[54] FLEXIBLE BLANKET SYSTEM FOR TREATING ASBESTOS CONTAINING MATERIALS

[76] Inventor: John W. Ratzesberger, 2400 16th St., Altoona, Pa. 16601

[21] Appl. No.: 859,093

[22] Filed: Mar. 27, 1992

[51] Int. Cl.⁵ .............................................. B05B 7/00
[52] U.S. Cl. .................................... 118/315; 118/313; 134/21
[58] Field of Search ................. 118/300, 313, 315; 55/20, 21; 134/111, 21

[56] References Cited

U.S. PATENT DOCUMENTS 4,604,111 8/1986 Natale ............................ 55/385.2
4,626,291 12/1986 Natale .................................. 134/21

Primary Examiner—W. Gary Jones
Assistant Examiner—Dean Tan Nguyen
Attorney, Agent, or Firm—Frank Benasutti

[57] ABSTRACT

A system for establishing a safe environment for removing dangerous, hazardous fibrous materials in situ over a substrate, comprises a flexible film wrap and fluid distribution system for providing a continuous misting of fluid to initially wet the materials and then continuing the misting of fluid intermittently to achieve saturation of the materials to the substrate. Thereafter, the materials are cured to substantially eliminate the generation of airborne fibers during removal of the materials.

18 Claims, 2 Drawing Sheets

FLEXIBLE BLANKET SYSTEM FOR TREATING ASBESTOS CONTAINING MATERIALS

TECHNICAL FIELD

This invention relates to asbestos removal and more particularly to the treating of asbestos-containing waste materials prior to removal.

BACKGROUND ART

In the prior art methods and apparatus for asbestos abatement and removal concentrated on particulate contamination control, such as the method and filtration device described and claimed in U.S. Pat. No. 4,604,111 issued to Anthony Natale. Other similar apparatus and methods are disclosed in such operations as those undertaken by Environet Inc., 323 West 39th Street, New York, N.Y., 10018 and in the patents disclosed and cited in the aforementioned Natale patent.

The Environmental Protection Agency (EPA) has produced a publication on toxic substances entitled "Guidance For Controlling Asbestos-Containing Materials In Buildings", EPA, 560/5-85-024 June 1985, Environmental Protection Agency, Washington, D.C. 20460. Therein various methods and apparatus are disclosed for treating and removing asbestos. One section of that publication, Section 5.1.3 describes a method of encapsulation with sealants. Encapsulation refers to the spraying of ACM (asbestos-containing materials) with a sealant. As stated in this section, the sealant should bind together the asbestos fibers and other material components and offer some resistance to damage from impact. In this section it further states that the sealant should penetrate the ACM and adhere to the substrate or form a tough skin over the material to withstand moderate impact, be flexible and flame retardant, resist deterioration over time and be non-toxic. The publication further states that latex paint has been used as a sealant and that the user should select a brand with a high vehicle content. For encapsulating ACM, the publication states that the paint applied should be considerably thicker than that recommended for painting. It further recommends that a method is to apply a light (mist) coat, then a full coat applied at a 90 degree angle to the direction of the first coat. It also states that the full coat may be applied by the use of a roller.

Various companies supply products designated as asbestos removal encapsulants, such as a product identified as 32-60 by Foster Products Corporation, 3200 LaBore Rad, Vadnais Heights, Minn. 55110. In literature describing such a product it states that the product penetrates deeply and quickly, such as for example: 3 inches of depth of penetration in 15 minutes on 100% amosite matrix. However, personnel of the company indicate that the actual penetration is on the order of one-eighth of an inch.

The problem with the removal of asbestos materials or the encapsulation of those materials in place, is that asbestos can be friable; that is to say, it is a material which can be crushed or pulverized with hand pressure and is subject to having fibers released into the atmosphere when it is crushed, thus causing a hazard to those in contact with that atmosphere. The object of the prior art has been to either contain this material or filter out the airborne fibers created in a controlled environment, such as a bag or room which is sealed off and subject to negative pressure. In addition to those referred to above, one such technique is the "glove bag". See for example U.S. Pat. No. 4,626,291.

Of course the problem with these prior art methods is that they either create airborne fibers which they have to rearrange or they encapsulate them creating additional problems for future removal.

The object of my invention is to eliminate to the fullest extent possible, under given circumstances, the creation of airborne fibers during the removal of asbestos-containing materials.

Further objects are as follows:
1. To eliminate the need for containment;
2. To eliminate the need for negative air systems (which, indeed, even require backup generators to take care of potential power outages);
3. To eliminate the need for decontamination chambers, under given circumstances;
4. To eliminate the need for any further containment within the immediate area;
5. To eliminate the need of further containment of adjoining areas or outside the area being worked on; and
6. To eliminate the expelling of 0.03% contamination to the environment from the filtering systems.

These and other objects of my invention will be apparent from the following description with reference to the accompanying drawings.

DISCLOSURE OF INVENTION

In accordance with this invention, a controlled environment is created with a plastic wrap material which facilitates total saturation of the ACM to the substrate. Thus when the ACM is removed, such as by cutting or scraping, the likelihood that fibers will become airborne is greatly reduced and, indeed, predominately eliminated.

MODES OF CARRYING OUT THE INVENTION AND DESCRIPTION OF PREFERRED EMBODIMENT

In accordance with my invention, the dangerous, hazardous fibrous material, such as ACM, to be treated is first blanketed by a container material. This blanket most preferably comprises three layers of plastic, such as 6 mil polyethylene plastic film; although conceivably within the scope of this invention 4 to 10 mil could be used.

Figure 1:
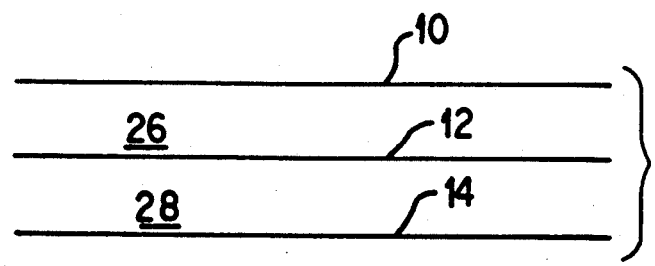
FIG. 1 shows schematically the make-up in a cross-section longitudinal elevation of th rapping materials utilized in accordance with my invention.

The layers of plastic film are arranged as shown in FIG. 1 at 10, 12 and 14. The first layer 10 is perforated with a variety of small pinholes which will be described more fully hereinafter. The second and third layers 12 and 14 respectively, are not perforated. All three layers are sealed around their periphery as shown in FIG. 3 at 18, with the exception of places which contain inlet ports, also to be described more fully hereinafter.

Figure 2:
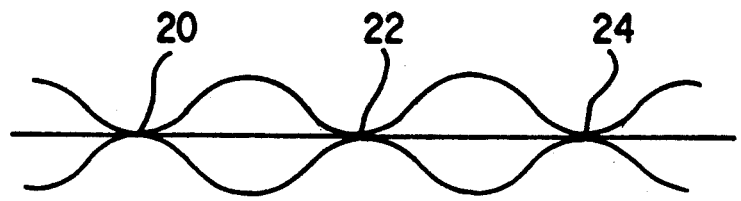
FIG. 2 is a view similar to FIG. 1 showing the materials joined together at discreet intervals to form one panel of a blanket.
Figure 3:
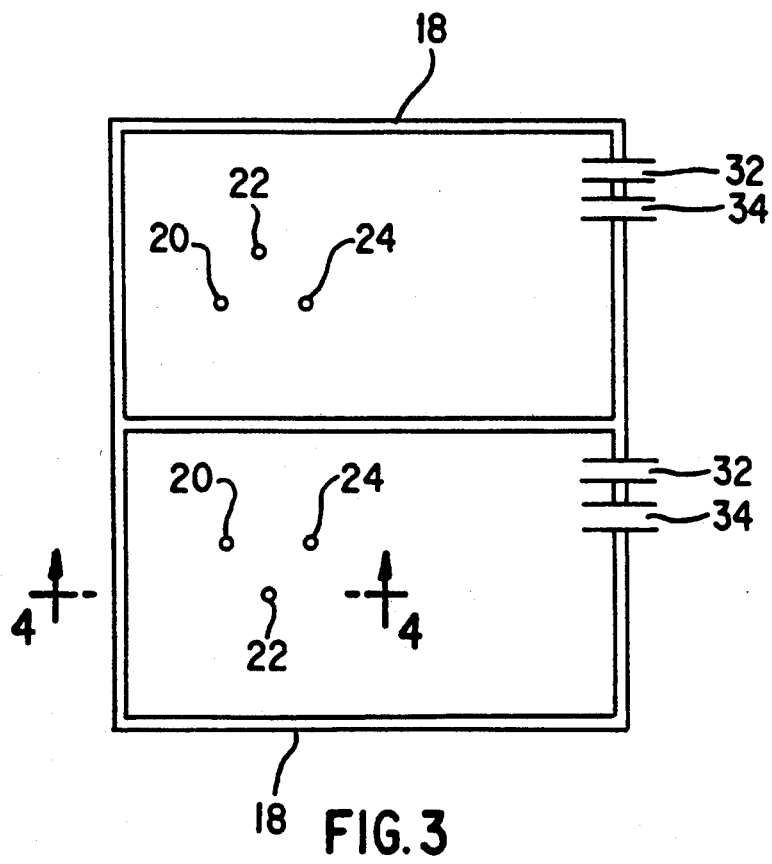
FIG. 3 is a plan view of the materials shown in the previous two figures.
Figure 4:
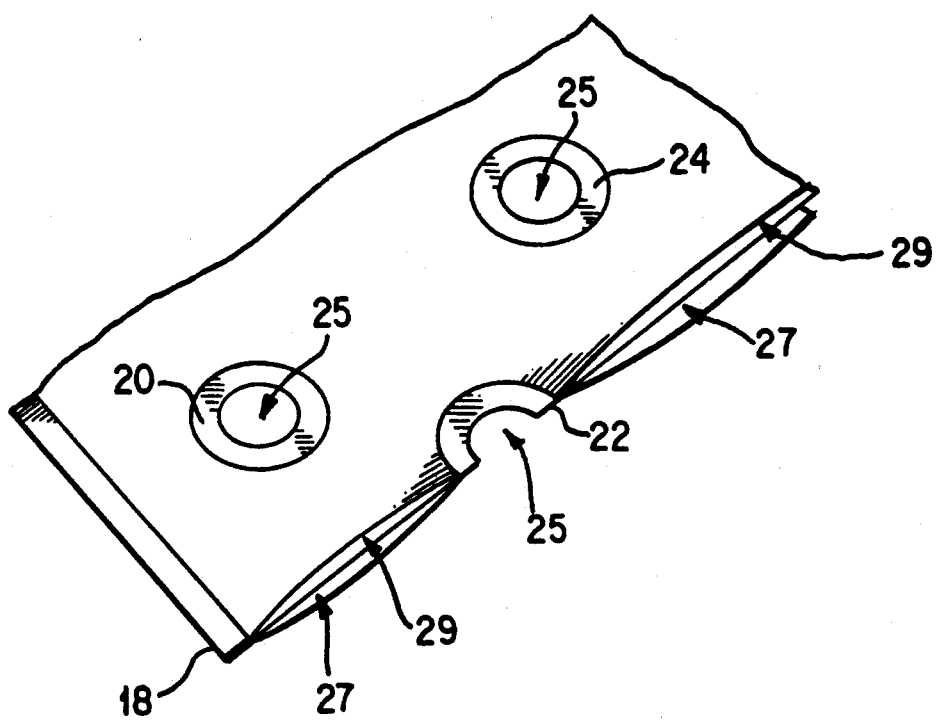
FIG. 4 is a perspective view taken from a section along the lines and arrows 4—4 in FIG. 3.

The layers are joined together by spot or heat welds at various intervals as shown at 20, 22, 24 FIGS. 2, 3 and 4. These spot or heat welds seal the layers to one another, and are most preferably circular in configuration. The circles are one to one and one-half inches in diameter with center area of three-quarters to one inch in diameter being removed, as at 25, FIG. 4. As shown in the plan view, FIG. 3, they are arranged in an alternating fashion so that while the layers are joined together at 22, 20, 24, 18 FIG. 4, there are portions of the layers which remain separated. See FIG. 4 at 27 and 29. These portions form the following containers. Container 26, FIG. 1, will be used to retain and supply the encapsulating fluid in accordance with this invention. Container 28, FIG. 1 will be used to supply pressure preferably by air against the adjoining side wall with container 26 to force the encapsulating fluid through the perforated wall 10 of container 26.

The means for adding and removing fluids such as air and encapsulating fluid to and from these containers comprises ports 32 and 34, FIG. 3. These may be in any suitable configuration so long as they are sealed to their respective containers and allow controlled ingress of fluid and ingress and egress of pressurized air. Port 32 is connected to container 26. Through this port, fluid is pumped and supplied to container 26. Port 34 is connected to container 28. Through this port, air under pressure is supplied to container 28.

In accordance with this invention, these chambers function as follows: the encapsulating fluid is introduced into container 26. The perforations in the wall 10 are such that the encapsulating fluid will not normally flow out through these perforations under normal atmospheric conditions. Accordingly, it is required that pressure be applied in order to force the material through the perforations. The diameter of the perforations is adjusted in accordance with the viscosity of the fluid.

As air is introduced into chamber 28, the plastic material 12 will stretch and apply a force against the encapsulating fluid in container 26. This will force the encapsulating fluid from the chamber 26 out through the perforations, which are in the range of microscopic to the size of pinholes, for permitting misting. In this manner, it is possible to give a fine spray or mist from the blanket. When the air pressure is decreased in container 28, the spraying action from chamber 26 terminates. Chamber 26 and 28 act in a reciprocating manner; that is, when chamber 26 is activated, such as by having encapsulated fluid pumped into it under a slight pressure, chamber 28 is vented to collapse and allow chamber 26 to expand and receive fluid. Once the pressure within chamber 26 equalizes with the inlet pressure, the passage of fluid ceases. If a higher pressure is required to reach inlet 32 than what is desired within chamber 26, an additional regulator would be installed at inlet 32 in order to decrease the pressure and thereby maintain the desired lower pressure within the chamber. Thereupon the air pressure through inlet valve 34 to chamber 28 is increased to force fluid form chamber 26.

The degree of pressure in these containers will vary. While it is desired to have the encapsulating fluid in chamber 26 under some pressure, it should not be high enough so as to cause the substance to run out of the chamber. Rather it is the use of the air in chamber 28 which forces the fluid out. The degree of pressure is dependent on the rate of spray or pulsating in particular applications, and on the rate of absorption of the ACM material. This part will depend on the existing moisture content of that material.

The supply to both of these containers can be pressurized drums with pressure gauges and regulators thereon (not shown, but conventional per se). Likewise, the connecting conduits can be plastic tubing (not shown in detail, but conventional per se). Where there exists access to standard plumbing water supply lines, these may be utilized for the fluid supply; whereupon a mixing or proportioning device is used for the addition of concentrated encapsulant material.

For vertical uses, polyethylene sheeting is placed on the floor, around the perimeter of the item from which the ACM is being removed. An absorbent tube or sock with an absorbing material such as vermiculite inside, can be positioned to receive any runoff from the operation.

The encapsulating materials which have been described a satisfactory can be selected from a group consisting: of latex base; alcohol base; and polyester resin base. However, both alcohol and polyester resin have environmental drawbacks and accordingly latex is the most desirable. Furthermore, it is desirable to have the latex mixed with a wetting agent. A material which has proven satisfactory is "HyStretch" produced by B.F. Goodrich, 9911 Brecksville Road, Cleveland, Ohio 44141-3247 and identified as either V-29 or V-43. Technical data sheets and MSDS sheets are available from that company and give information regarding these elastomer emulsions.

Also identified in the prior art as useful is "Rhoplex" GL-618 elastomeric available from Rohm and Haas Company, Philadelphia, Pa. 19105.

Wetting agents such as Super Water-Wetter surfactant as supplied by Industrial Products Company, 21 Cabot Blvd., Langhorn, Pa. 19047 identified by part no. AS205 may be added to make the fluid penetrate the material to the substrate.

As stated in the EPA Guidance for Controlling Asbestos-Containing Materials in Buildings (previously referred to ) at Page 5-3 under Section 5.1.1 Removal, Disposal, and Replacement, the ACM must first be treated with a solution of water and a wetting agent to reduce fiber release. Some types of Amosite-containing materials will not absorb either water or water combined with the wetting agent suggested by the EPA (fifty percent polyoxyethylene ester and fifty percent polyoxyethylene ether. Where amended water is not as effective in fiber emission control with amosite containing materials, ethylene glycol has been used. Other various proprietary materials are claimed to be or proven to be effective in control of amosite and chrysotile fiber emission during removal.

There still exists a need for a system, which will enable these materials to achieve their end goal of total saturation. Through the use of my saturation blanket, accomplishing the goal of total saturation is now possible. The type of encapsulating fluid, used in conjunction with my saturation blanket, would be determined based on the particular situation, whether it be removal or permanent encapsulation.

In accordance with my invention, saturation is achieved by using the following method. I first cover the floor around or under the immediate work area with polyethylene plastic. Then I begin to cover or wrap the ACM using the saturation blanket with the perforated side facing the ACM. The blanket is installed in a manner which will cover the ACM in its entirety if possible.

If cut outs need to be made, for obstructions etc., the cut edges must be resealed, preferably using a portable heat sealing tool. It is not of concern if small areas are not covered, as the time required to achieve total saturation would only be slightly increased. All supply lines are installed and the system is activated. A continuous spraying action is initiated and continued until superficial saturation is achieved, that is the absorption rate is slower than the run off rate. At this time, the fluid pressure is reduced and a pulsating action is initiated with the intermittent activation of the air chamber to create an intermittent spray. The pulsating rate is either increased or decreased based on visual observation of run off, to coincide the rate of spray with absorption rate. This adjustment is periodically made, again based on visual observation of the runoff.

The function of the spot or button welds, with their centers removed will no be readily understood. These port holes make for easy access for performing core sampling. It is by way of this random core sampling that total saturation to the substrate can be confirmed.

Adding a colorant or dye to the encapsulating fluid makes visual confirmation possible without th need for additional equipment. This confirmation is made prior to any disturbance or removal of the ACM. The system is then deactivated by shutting off the fluid supply, while continuing the air pressure pulsations until the fluid chamber is vacated and then shutting off the air supply.

If the ACM is to remain, or if the encapsulant is to be cured prior to removal, the port holes within the spot or button welds may again be utilized for core sampling to confirm the extent of cure. The port holes also supply a means for ventilation during curing. After curing is confirmed the saturation blanket may be removed.

If wet removal is the choice, the saturation blanket may be removed in its entirety or, one panel at a time, by cutting through the heat seal joining the panels together; thus permitting reactivation of the remaining panels within the blanket, if deemed necessary, while removal activities proceed; thereupon eliminating the potential of any drying out or curing to occur prior to removal or when desired.

Under existing technology, workers spray and wet the ACM with amended water. Since penetration to a saturation point is rarely complete, airborne fibers are created and released into the atmosphere at the same time. The workers continue to mist the air in an attempt to knock down the airborne fibers. By my method, it is possible to totally saturate and to determine whether the material has been fully saturated or cured, down to the substrate; thus allowing workers to know beforehand when safe removal of the ACM is possible and thereby not create, nor be exposed to, a hazardous environment.

The perforations may be in a hexagonal design around the spot weld. As previously mentioned, they range from a microscopic size allowing very little if any seepage to occur while still permitting a mist from the chamber 26, or larger in diameter to emit a greater volume spraying action upon increasing either the fluid supply chamber pressure or the air chamber pressure. If appropriate, they may be sized to facilitate a continual misting or spraying without excessive supply chamber pressure or indeed without incorporating the use of the air chamber.

It should be understood that the closer the spacing between the spot welds, the higher the pressure needed to get the material into chamber 26 and the less fluid there will be in the chamber 26. This also affects the fluid pressure and force. I have found that a spacing of one-half inch to three-quarters of an inch is satisfactory.

In the manufacture of the blanket, it is desirable to perforate the sheet 10 prior to assembling it with the other sheets and spot welding.

The number of perforations depends upon the application. It should be apparent that since the material is curved when the chamber is expanded, all the perforations do not face in the same direction, and therefore, there is as need to provide enough to insure a thorough misting.

For premeasured areas, portions of the blanket may be cutout and heatsealed around their periphery either on the job or beforehand, keeping in mind not to create an isolated area within the blanket which would then not be able to receive the fluid or air from the supply inlets.

I claim:

1. A system for establishing a safe environment for removing dangerous, hazardous fibrous materials in situ over a substrate, said system comprising:

flexible film means, said flexible film means comprising multiple layers sealed to form separate chambers containing fluid and gas for providing a continuous misting of fluid to initially wet said materials, substantially surrounding said materials and having perforations therein to permit said misting therethrough;

means for continuing the misting of fluid intermittently to achieve saturation of said materials to said substrate; and means for curing said materials to substantially eliminate the generation of airborne fibers during removal of said materials.

2. The system of claim 1, wherein means are provided for determining the status of the said materials by sampling to confirm saturation to said substrate.

3. The system of claim 1, wherein said flexible film means comprises three layers of plastic sheeting, heat sealed together along their periphery and at various spots throughout their interior area to form separate chambers.

4. The system of claim 3, wherein the said flexible film means further comprises inlet port means to provide for controlled ingress of fluids into said chambers.

5. The system of claim 4, wherein the said inlet port means further provide the access points where misting fluid and air are pumped through into separate chambers.

6. The system of claim 5, wherein said separate chambers created between the three layers of said sheeting, comprise a first chamber having a surface with said perforations placed to face said materials, said first chamber being connected through at last one port to a source of misting fluid and a second chamber being connected through a second port to a source of compressed air.

7. The system of claim 6, wherein the said three layers of sheeting are polyethylene of approximately a thickness in the range of 4 mil to 10 mil per layer.

8. The system of claim 7, wherein the said heat sealing comprises spots which are heat sealed intermittently throughout the said sheets.

9. The system of claim 8, wherein said spots have their centers removed.

10. The system of claim 9, wherein the spots with their centers removed provide a means for taking a sample to confirm saturation.

11. The system of claim 6, wherein the fluid is pumped at a steady rate of pressure, allowing for continuous spraying until the surface of said materials is saturated.

12. The system of claim 6, wherein the fluid supply and the air supply operate in a reciprocating manner thereby generating a pulsating action.

13. The system of claim 12, wherein the said pulsating spraying continues until total saturation of the said materials to the said substrate is confirmed.

14. The system of claim 12, wherein reciprocating is achieved when the said fluid supply pressure is on, the said air supply pressure is off and then said fluid supply pressure is turned off, and said air supply pressure is turned on.

15. The system of claim 4, wherein the said continuous spraying is terminated by means of reduction of fluid pressure to one of said chambers.

16. The system of claim 1, wherein the said perforations range from microscopic to visible sized pinholes.

17. The system of claim 1, wherein the fluid is an encapsulating fluid means for binding the fibers together and thereafter curing to permit the materials to remain flexible.

18. The system of claim 1, wherein the means for continuing the misting intermittently is activated when the wetting fluid is no longer being absorbed by the materials at a continuous misting rate.

* * * * *